United States Patent [19]

Rupert et al.

[11] Patent Number: 5,608,356

[45] Date of Patent: Mar. 4, 1997

[54] THERMOMETER FOR REMOTE TEMPERATURE MEASUREMENTS

[75] Inventors: Robert E. Rupert, South Dennis; Norman C. Anderson, Chatham; Morris Weiss, N. Harwich, all of Mass.

[73] Assignee: Infratemp, Inc., South Dennis, Mass.

[21] Appl. No.: 461,926

[22] Filed: Jun. 5, 1995

Related U.S. Application Data

[62] Division of Ser. No. 345,083, Nov. 28, 1994, which is a division of Ser. No. 149,864, Nov. 10, 1993, Pat. No. 5,391,001.

[51] Int. Cl.$^6$ .................................. H03B 5/32; H03L 7/06
[52] U.S. Cl. .......................... 331/18; 331/155; 331/158; 331/162; 310/317; 310/319
[58] Field of Search ......................... 331/18, 66, 116 R, 331/116 FE, 116 M, 155, 158, 162, 163; 310/314, 316, 317, 318, 319

[56] References Cited

U.S. PATENT DOCUMENTS

| | | | |
|---|---|---|---|
| 3,518,573 | 6/1970 | Smith | 331/163 X |
| 3,713,045 | 1/1973 | Usuda et al. | 331/116 M X |
| 3,743,960 | 7/1973 | Stendel | 331/116 M X |
| 4,233,512 | 11/1980 | Rupert | 331/155 X |
| 4,801,897 | 1/1989 | Flecken | 331/155 X |
| 5,319,324 | 6/1994 | Satoh et al. | 331/158 |

*Primary Examiner*—David Mis
*Attorney, Agent, or Firm*—Kenyon & Kenyon

[57] ABSTRACT

An instrument is provided for measuring the temperature of an object from infrared radiation emitted by the object. The instrument includes a radiation detector, a temperature indicating device connected to the detector, and a modulator disposed in a path of a radiation beam from the object for converting the beam into a series of pulses when the modulator is vibrated in and out of the path. The modulator includes a primary piezoelectric element adapted to vibrate when subjected to driving signals at a frequency related to the resonant frequency of the modulator, and a secondary piezoelectric element connected with and driven by the primary piezoelectric element. The secondary piezoelectric element is electrically insulated from the primary piezoelectric element. The modulator also includes a blocking element connected with the secondary piezoelectric element and disposed to move in and out of the path of the beam. A phase locked loop oscillator circuit is connected to the primary and secondary piezoelectric elements for operating the primary element. The secondary piezoelectric element is adapted to generate a signal indicative of the phase and frequency of the primary piezoelectric element to lock the circuit at the resonant frequency of the modulator.

2 Claims, 6 Drawing Sheets

THERMOMETER FOR REMOTE TEMPERATURE MEASUREMENTS

This application is a division of application Ser. No. 08/345,083, filed on Nov. 28, 1994, which is a division of Ser. No. 08/149,864, filed on Nov. 10, 1993 now U.S. Pat. No. 5,391,001.

FIELD OF THE INVENTION

This invention relates generally to temperature measuring devices and, more particularly, is directed towards an improved device for measuring the temperature of a remote object, including a novel resonant circuit.

BACKGROUND OF THE INVENTION

U.S. Pat. No. 3,925,668 discloses a temperature measuring device designed to remotely measure the temperature of an object, i.e., the temperature is measured without direct contact with the object. The device is useful in various clinical and industrial applications and for various consumer uses. Radiant energy from the object being monitored is sensed by the device by use of an aperture, optical filter, electro-mechanical modulator and a radiation sensor along with appropriate electronic circuitry and a temperature indicator output display. The modulator for the foregoing device consists of a magnet, a moving coil and a vibrating needle disposed in the path of the radiation, which is adapted to change the radiation impinging upon the sensor from a steady state to a pulsed state.

U.S. Pat. No. 4,233,512 also discloses a thermometer for making remote temperature measurements, including a temperature sensor element and a modulator for converting radiation emitted by the object being monitored from a steady state to a pulsed state. The modulator consists of a piezoelectric ceramic reed element adapted to chop the radiation at a precise, fixed frequency prior to impingement on the sensor element. The piezoelectric device forms part of a resonant circuit in which the device serves as an active element in a phase locked loop arrangement used to drive and stabilize the modulator. The piezoelectric device deflects under applied voltage and also generates a signal that is used to lock the circuit onto the resonant frequency of the device.

One object of the present invention is to provide a remote temperature measuring device having a modulator with improved means for generating a feed back signal for phase lock control of the modulator. Another object of the invention is to extend the frequency range under which the modulator can be operated to provide useful resonant motion.

SUMMARY OF INVENTION

The present invention is directed to an improved modulator for an instrument for measuring the temperature of an object from infrared radiation emitted by the object. The instrument includes a radiation detector adapted to generate an electrical output in response to radiation impinging thereon, a temperature indicating device connected to the detector for converting the electrical output of the detector into a display representative of the temperature of the object, and a modulator that is disposed in a path of the radiation beam for converting the beam into a series of pulses when the modulator is vibrated in and out of the path. The modulator includes a primary piezoelectric element adapted to vibrate when subjected to driving signals at a frequency related to the resonant frequency of the modulator, and a secondary piezoelectric element connected with and driven by the primary piezoelectric element. The secondary piezoelectric element is electrically insulated from the primary piezoelectric element. The modulator also includes a blocking element connected with the secondary piezoelectric element and disposed to move in and out of the path of the beam. A phase locked loop oscillator circuit is connected to the primary and secondary piezoelectric elements and provides driving signals to the primary element. The secondary piezoelectric element is adapted to generate a reference signal indicative of the phase and frequency of the primary piezoelectric element to lock the circuit at the resonant frequency of the modulator.

DETAILED DESCRIPTION

Figure 1:
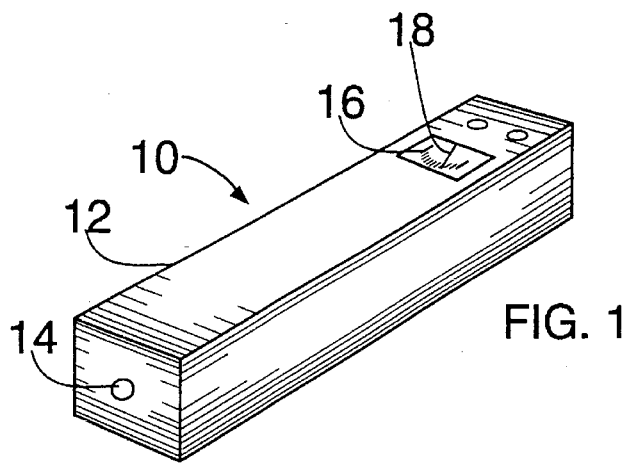
FIG. 1 is a perspective view of an instrument for making remote temperature measurements.

FIGS. 1–7 illustrate a thermometer with its primary components and the operation thereof as disclosed in U.S. Pat. No. 4,233,512. FIG. 1 shows a small, light weight, portable thermometer 10 adapted to remotely read the temperature of an object (not shown). The thermometer 10 may be used, for example, as a clinical thermometer for taking the temperature of a patient without making physical contact with the patient. The thermometer 10 comprises a housing 12 including an aperture 14 at one end thereof that may be directed toward the patient or object whose temperature is to be measured. If the subject is a patient, the device is typically directed towards his or her mouth or, alternately, some other part of the body where a temperature abnormality is suspected. At the opposite end of the housing 12 in the top wall thereof, a gauge 16 is provided with a movable needle 18 that moves across the gauge face to indicate the temperature measured by the instrument. Other types of readout devices like digital displays may be utilized in place of the gauge shown.

Figure 2:
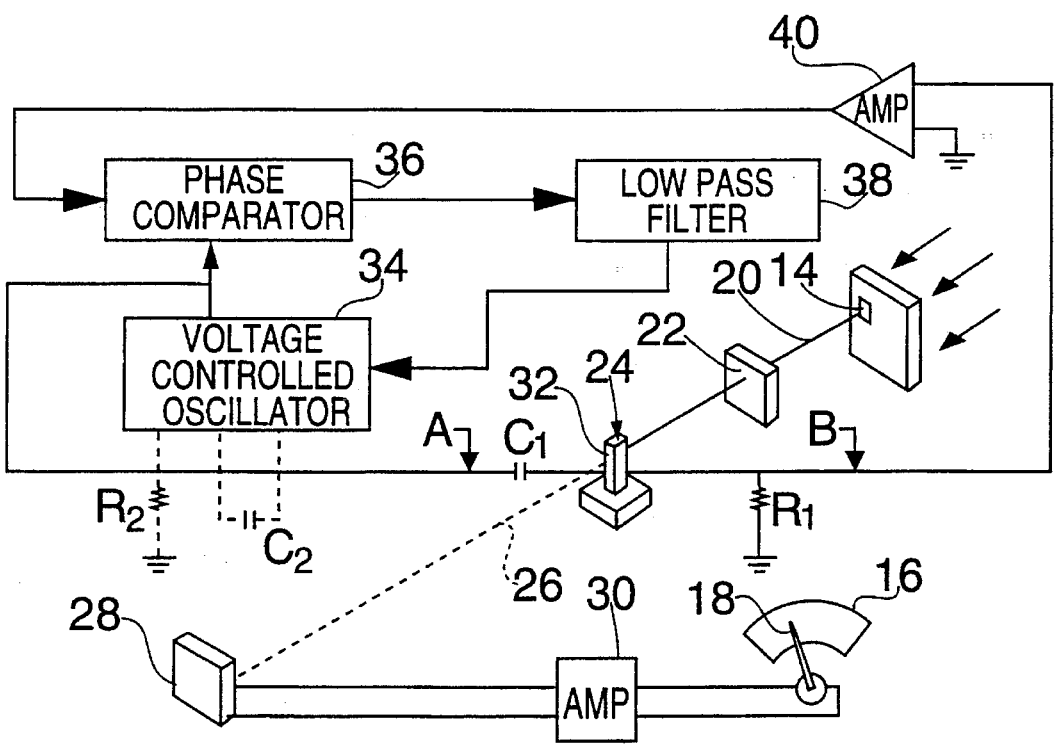
FIG. 2 is a schematic diagram of the primary operating components of a prior art remote temperature measuring device.

FIG. 2 illustrates in schematic form the primary operating components of a prior art temperature measuring instrument. As shown, infrared energy from a patient, etc., passes through the aperture 14 as a steady beam 20 and through a filter 22 before passing through a modulator or chopper 24, which converts the steady beam 20 into a pulsed beam 26 prior to impingement upon an infrared detector 28. The detector 28 converts the pulsed IR energy 26 into pulsed electrical energy, which is amplified at 30 and processed through analog circuits to drive the display meter 16. The conversion of the steady state IR energy to a pulsed state avoids DC drift that might otherwise occur, thereby increasing the accuracy of the instrument. The IR sensor 28 may be one of various devices adapted to convert IR energy to electrical energy. Use of thin lead sulfide devices as the IR sensor has provided satisfactory results.

Figure 3:
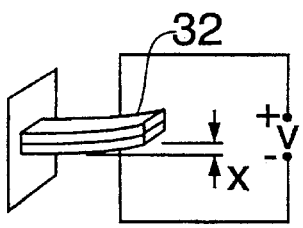
FIGS. 3–5 are perspective views schematically illustrating the behavior of a piezoelectric element in response to an applied DC voltage.
Figure 4:
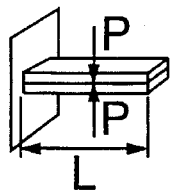
Figure 5:
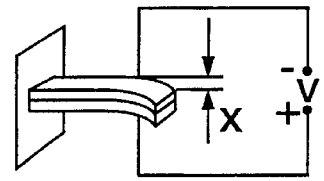

The modulator 24 is a piezoelectric ceramic device in the form of a reed 32 that physically deflects when a DC voltage is applied thereto. FIGS. 3–5 illustrate the reaction of the piezoelectric reed when a DC voltage is applied to it. In FIG. 3, the device deflects or is bent upwardly when a positive voltage is applied to the upper half of the reed and a negative voltage is applied to its lower half. In FIG. 4, the reed is shown at rest when no voltage is applied to it, and in FIG. 5, the reed is bent downwardly when a negative voltage is applied to the upper half of the reed and a positive voltage applied to the lower half. In FIGS. 3–5, X indicates the displacement of the device due to bending action thereof when subjected to the voltage, P indicates the direction of the polarization, V indicates the voltage applied, and L indicates the length of the piezoelectric reed.

The piezoelectric ceramic reed 32 may be dimensioned such that the reed's natural resonant frequency of one quarter wave length or a multiple of one quarter wave length falls into an audio frequency range of 40 to 600 Hz. The piezoelectric ceramic material is classified as a "motor" or "bender" implying that a mechanical motion is produced as a result of applying an electric potential. These materials will also produce the reverse effect by generating a voltage as a result of mechanical deformation, although the choice of a single material may not be optimal for both functions. If a pulsed voltage is applied to the reed, it will deflect in the manner shown in FIGS. 3–5 and vibrate at a steady amplitude. Chemically, these materials are identified as titinates or zirconates of lead or barium.

FIG. 2 illustrates a circuit adapted to drive the reed 32 at its resonant point and hold it at that point under normal operating conditions as typically might be found if the circuit were incorporated in a medical temperature sensing instrument. The illustrated circuit has the inherent ability to not only search out the resonant frequency of the reed, but to also lock itself on that frequency once it is established.

In the FIG. 2 circuit, the piezoelectric reed element 32 forms an integral, active part of the circuit in addition to providing chopper functions for the IR energy directed against the sensor 28. The circuit includes a voltage controlled oscillator ("VCO") 34 that provides the driving signals to the piezoelectric reed 32 and that also provides an error signal to a phase comparator 36. A low pass filter 38 receives the output of the phase comparator and provides an input to the VCO 34. An amplifier and low pass filter 40 serves to amplify the reference output signal of the reed 32 and return it to the phase comparator signal input 36. The circuit is adapted to supply its own reference frequency as well as a phase shifted error signal. These two signals are applied to the phase comparator.

Figure 6:
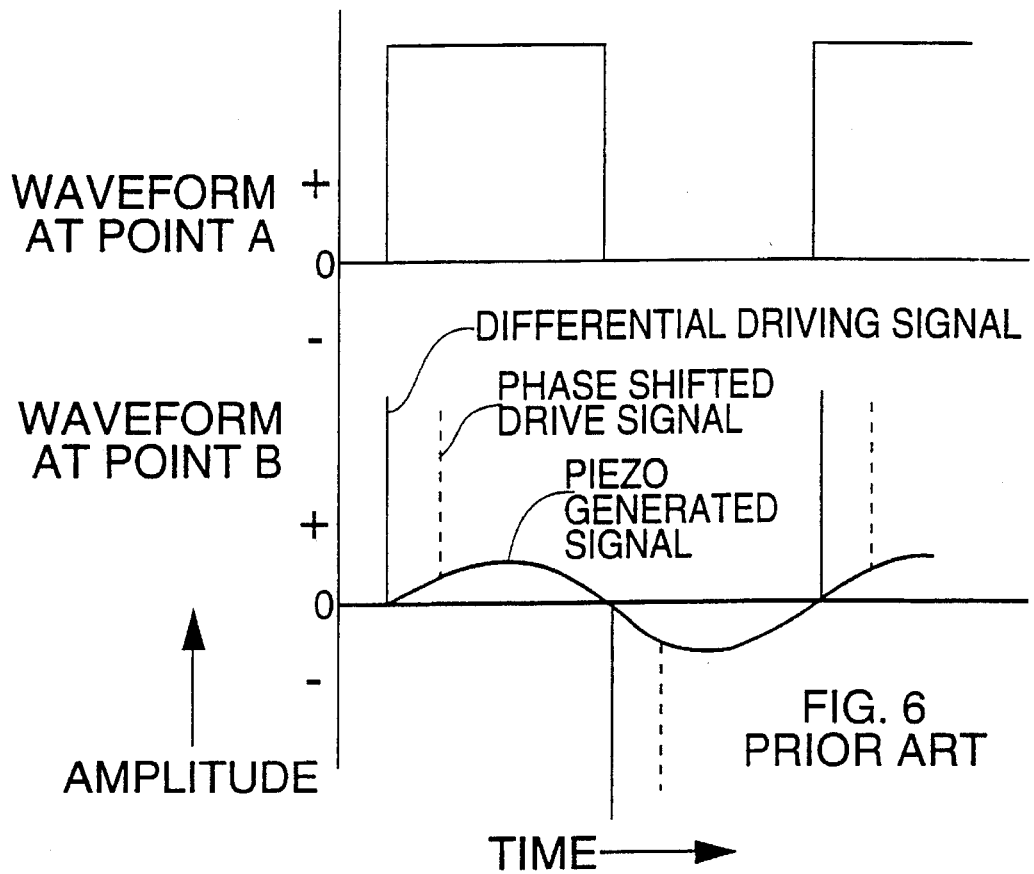
FIG. 6 is a chart illustrating the wave forms in the FIG. 2 circuit at different points thereof.

The normal, free running frequency of the VCO 34 is set approximately close to the fundamental resonant frequency of the piezoelectric reed 32. This is a square wave with a 50% duty cycle at the output of the VCO at point A. The same wave form appears on both sides of a capacitor $C_1$. This capacitor is electrically in series with the reed 32, which itself appears as a capacitor due to its metal-ceramic-metal sandwich configuration. Both capacitors in conjunction with a resistor $R_1$ act as a differentiating network for the applied square wave resulting in a positive and negative spike appearing at point B. These spikes represent the driving impulses that cause the piezoelectric reed to bend physically in a near sinusoidal manner and create a usable displacement at the free end of the reed to provide the optical chopping of the beam 20. Point B, however, indicates that there is an additional waveform present that occurs between the positive and negative spikes and, at resonance, this waveform approximates a sine wave connecting to the spikes on the positive and negative excursions. The source of this second waveform is the piezoelectric reed 32 generating its own output voltage as a result of its bending. This generator effect produces a low voltage measurable output and is not masked by the driving signal, because the driving signal is AC coupled to the piezoelectric and differentiated at point B. These waveforms are illustrated in FIG. 6.

The output signal generated by the piezoelectric reed 32, after amplification at 40, is phase compared with its driving signal in a phase locked loop configuration. Employing a phase comparator that operates in quadrature, 90° between its two inputs, and applying the piezo generator signal to its input, the piezoelectric reed 32 will be driven towards its resonant frequency until phase lock occurs. If the center frequency of the voltage controlled oscillator is set near the resonant frequency of the reed, it will shift in response to the phase error voltage produced by the low pass loop filter. Phase dynamics of the system will drive the reed to resonance whether the free running frequency of the VCO is above or below the resonant frequency.

The self seeking and locking features make this piezo element and circuit very useful as a radiation modulator or other device operating in the audio frequency range where a stable locking state is rapidly achieved. The circuit has a minimum number of components and tolerances may be low. In addition, resonance stability is achieved without temperature compensation, expensive crystals, mixing or dividing circuits.

Figure 7:
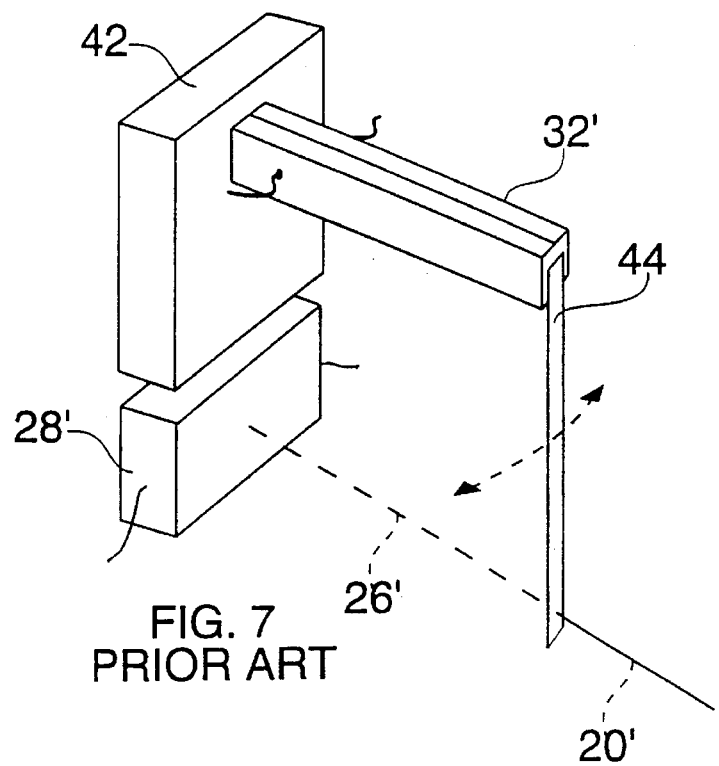
FIG. 7 is a perspective view of another prior art device.

FIG. 7 illustrates an alternative piezoelectric reed design. Instead of the reed 32 being disposed directly along the optical path of the beam 20 as shown in FIG. 2, a reed 32' is mounted on a fixed support 42 at one end and at the opposite free end carries a sniff, lightweight, optically dense shield 44. The shield 44 is attached to the free end of the reed 32' and extends across the optical path of the beam 20' to interrupt the beam and chop it prior to impingement against a radiation sensor 28'. When the reed 32' is subjected no a pulsed signal, it will vibrate in the manner described above and the shield 44 will oscillate across the optical path to chop the beam 20'. The offset configuration provided by the shield on the reed allows more flexible and convenient arrangements for the components of the optical system. The addition of the shield will add some mass to the reed, which will result in some shift of its resonant frequency in a slightly downward direction.

The values of the resistor and capacitor in the circuit must be low enough to differentiate the driving signal from the self generated signals of the piezoelectric reed. Typically $C_1$ may have a value of 0.1 to 0.2 MFD. The amplifier 40 should have low pass characteristics in order to eliminate spikes from passing on to the comparator 36. The comparator 36 should see only the signals generated by the piezo element, otherwise the spikes, if passed, will make the circuit unstable and prevent the desired phase locking action from occurring. Thus, it is important to separate the driving signals clearly from those signals generated by the piezoelectric reed. The function of the capacitor $C_1$ is to provide DC isolation for the piezoelectric reed itself.

Figure 8:
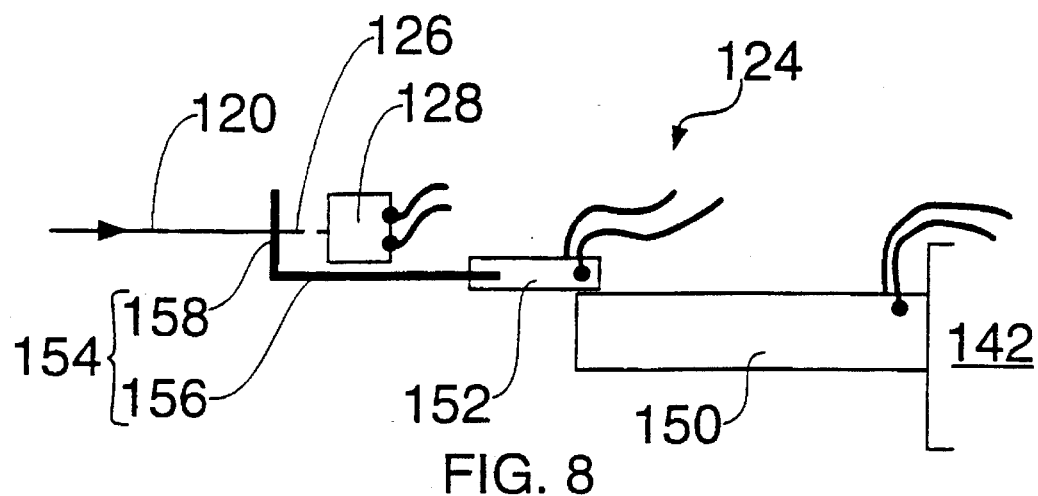
FIG. 8 is a side elevation view of modulating device of an instrument for making remote temperature measurements in accordance with one embodiment of the invention.
Figure 9:
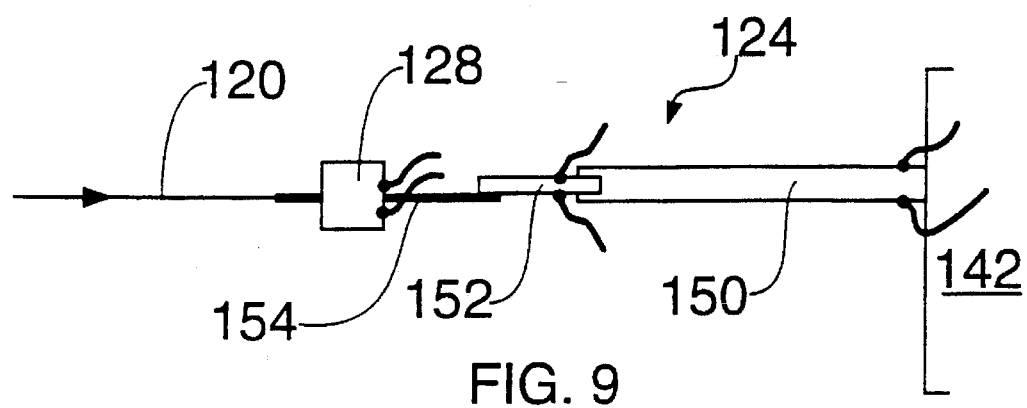
FIG. 9 is a top plan view of the device shown in FIG. 8.

FIGS. 8 and 9 are side and top views, respectively, of an improved modulator 124 for an instrument for remotely measuring temperature in accordance with the invention. The modulator 124 comprises a primary piezoelectric element 150, a secondary piezoelectric element 152, and a blocking element 154. The primary piezoelectric element 150 is mounted on a fixed support 142 at one end thereof similar to the piezoelectric elements 32 and 32' of FIGS. 2 and 7, respectively. The blocking element 154 is a thin, flexible metallic part that is generally "L" shaped, comprising a horizontal member 156 and a vertical member 158. The vertical member 158 serves as an optical interrupter like the element 32 of FIG. 2 or the shield 44 of FIG. 7; it converts a steady beam 120 of radiation energy from the object (not shown) whose temperature is to be measured into a pulsed beam 126 prior to impingement upon an infrared detector 128. The detector 128, like the detectors of FIGS. 2 and 7, converts the pulsed IR energy into electrical energy. The detector 128 may be connected with appropriate temperature indicating means (similar to that shown in FIG. 2) that convert the electrical output of the detector to a display representative of the temperature of the object.

The end of the horizontal member 156 of the blocking element 154 distal to the vertical member 158 is attached to one end of the secondary piezoelectric element 152. The other end of the secondary piezoelectric element 152 is attached to the primary piezoelectric element 150. The resonant frequency of the modulator 124 may be adjusted by varying the lengths of the piezoelectric elements 150, 152 and the blocking element 154.

Figure 10:
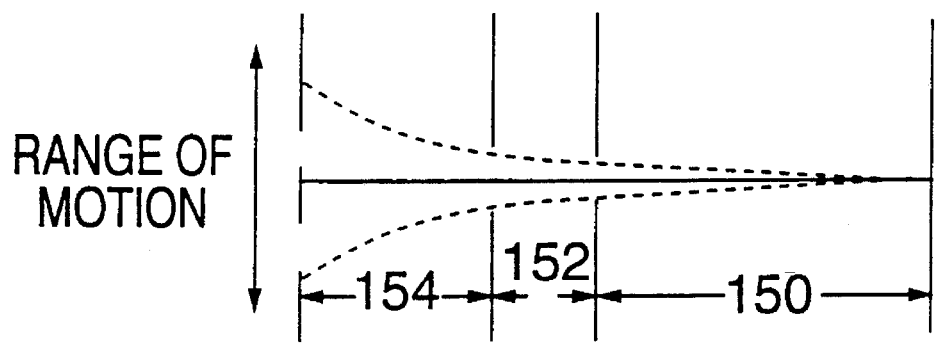
FIG. 10 is a chart illustrating the relative ranges of motion of the various elements of the device shown in FIGS. 8 and 9.

Like the prior art piezoelectric elements 32, 32' of FIGS. 2 and 7, respectively, the primary piezoelectric element 150 alone provides only limited mechanical motion at frequencies exceeding 100 Hz. This is primarily due to the material stiffness of the element and its length to resonant frequency relationship. The modulator 124 in accordance with the present invention, however, provides useful resonant motion at an extended frequency range by adding the thin, flexible blocking element 154 to the piezoelectric elements 150, 152. The frequency range is extended such that useful resonant motion can occur at frequencies as high as 1 KHz. FIG. 10 illustrates the ranges of motion of the primary and secondary piezoelectric elements 150, 152 and the blocking element 154 of the modulator 124 when the primary piezoelectric element 150 is vibrated by driving signals supplied thereto. As shown, the range of motion of the primary piezoelectric element 150 is significantly amplified by the blocking element 154.

Like the prior art modulators shown in FIGS. 2 and 7, the modulator 124 is connected with control circuitry (not shown) adapted to drive the modulator 124 at its resonant point and hold it at that point under normal operating conditions. However, the resonant circuit formed by the modulator 124 of the present invention differs from the prior art as described below.

The prior art modulators of FIGS. 2 and 7 each comprise a single piezoelectric vibrating element 32, 32' that is both energized by driving signals to vibrate and that generates a control or feedback signal for phase lock control. However, detection of the generated feedback signal requires very low level signal separation from the much larger driving signal, leading to start-up and signal capture uncertainties. The present invention overcomes this problem by providing two piezoelectric elements: the primary piezoelectric element 150, which is energized by driving signals from the circuit, and the secondary piezoelectric element 152, which is mechanically driven by the primary element 150 and which generates the feedback control signal. The secondary piezoelectric element 152 is mechanically joined to the primary piezoelectric element 150, but is electrically insulated from the primary element 150. Because the secondary piezoelectric element 152 comprises a piezoelectric device, it will generate an electrical signal in response to and indicative of its driven motion. Since the secondary element 152 is also electrically isolated from the primary element 150, the electrical signal output provided by the secondary element 152 will describe the phase and frequency of the primary element 150 without requiring use of processing or amplification devices for its detection.

The modulator 124 forms an integral, active part of the control circuit, which also includes a voltage controlled oscillator and a phase comparator. The voltage controlled oscillator provides driving signals to the primary piezoelectric element 150 and also provides an error signal to the phase comparator. The secondary piezoelectric element 152 provides the signal indicative of the phase and frequency of the primary piezoelectric element 150 to the phase comparator. The phase comparator provides an output that is a function of the signals received from the oscillator and the secondary piezoelectric element to the oscillator. The circuit is thus adapted to drive the modulator to its resonant point and to hold it at that point during operation of the temperature measuring instrument.

Figure 11:
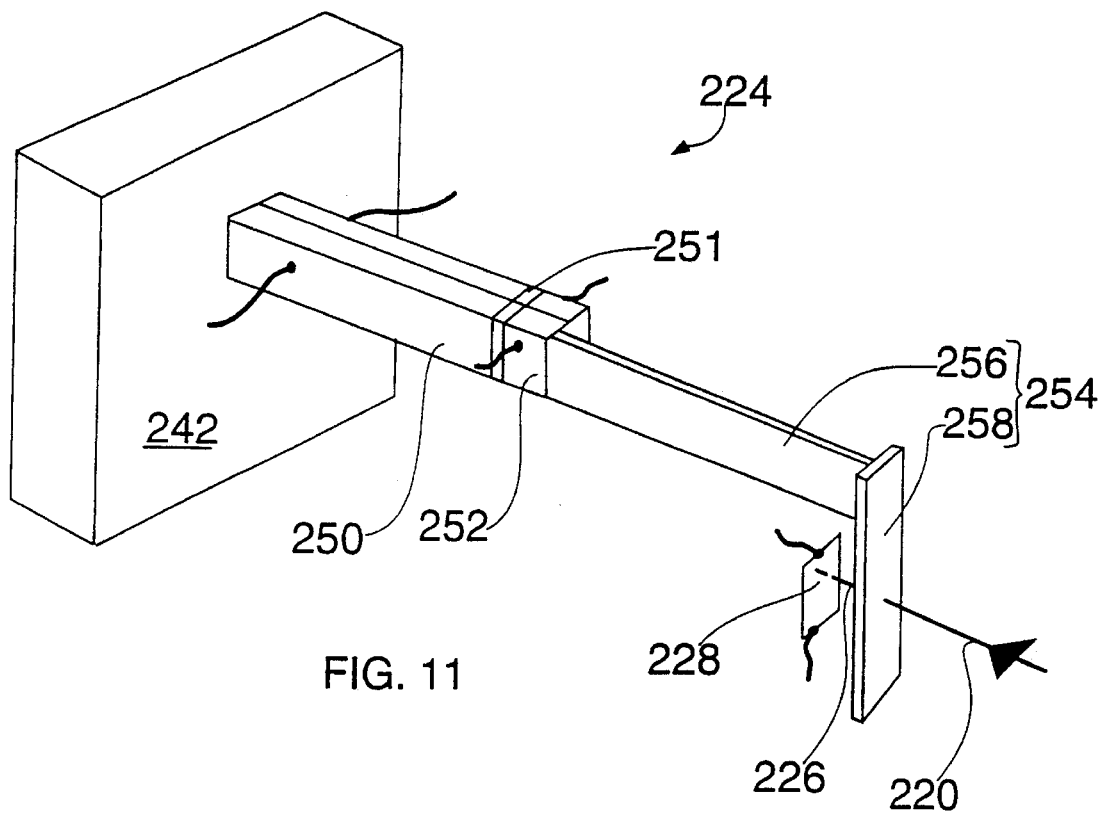
FIG. 11 is a perspective view of a modulating device in accordance with an alternative embodiment of the invention.
Figure 12:
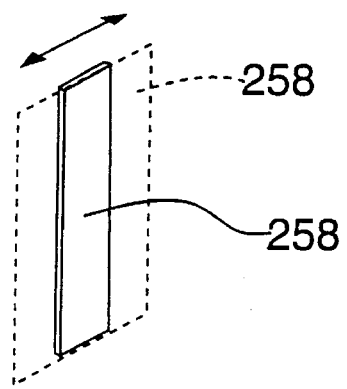
FIG. 12 is a perspective view of a portion of the device shown in FIG. 11, illustrating its sideways chopping motion.

FIG. 11 illustrates a modulator 224 in accordance with another embodiment of the invention. The modulator 224 comprises a primary piezoelectric element 250, a secondary piezoelectric element 252 and a thin, flexible metallic blocking element 254. The primary element 250 has a first end fixed to a modulator base 242 and an opposite second end coupled mechanically, but not electrically, to one end of the secondary piezoelectric element 252. An insulating element 251 is positioned between the piezoelectric elements 250, 252. The other end of the secondary piezoelectric element 252 is secured to the blocking element 254. The blocking element 254 is generally "L" shaped, comprising a horizontal member 256 and a vertical member 258.

Figure 13:
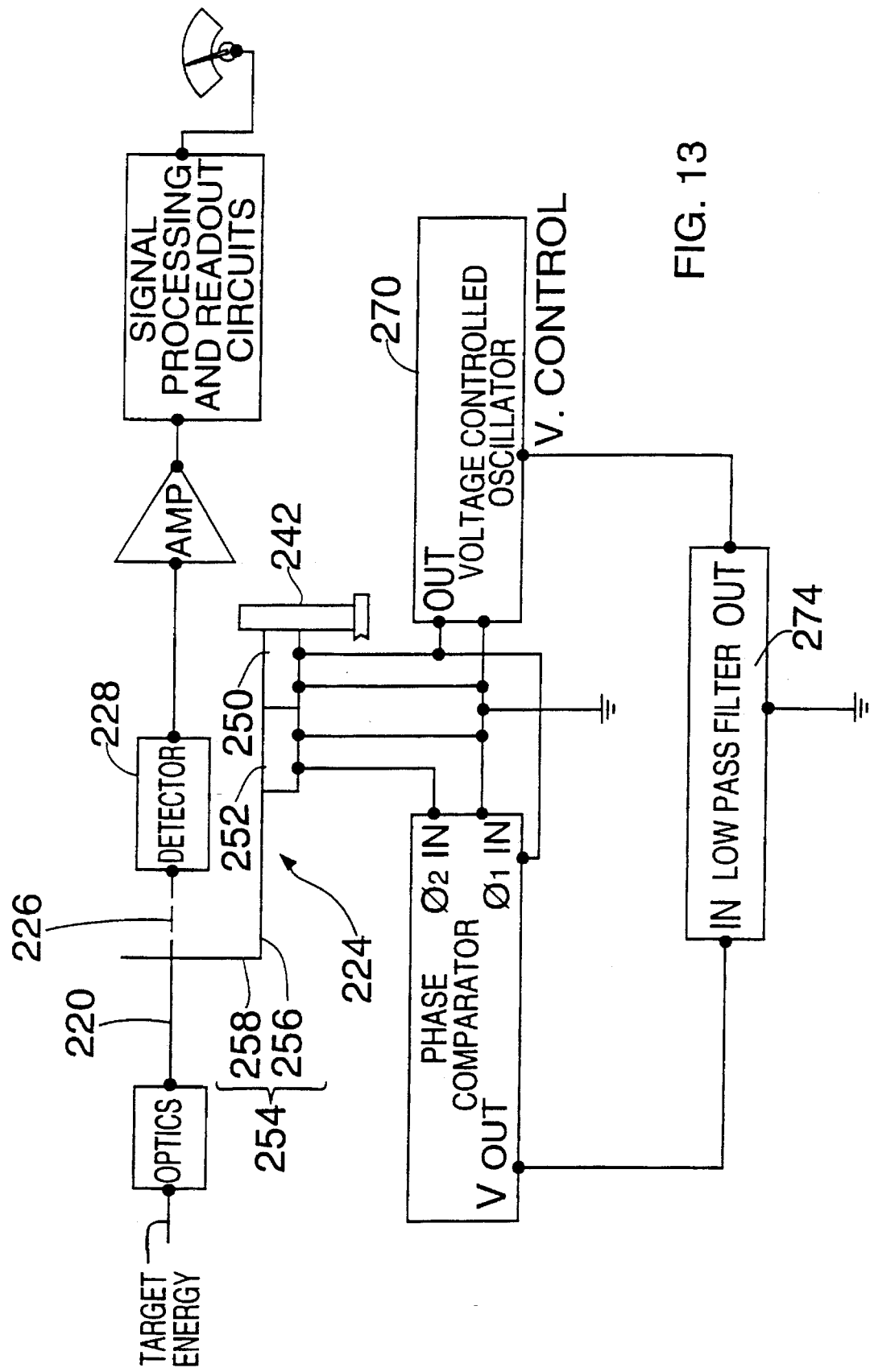
FIG. 13 is a schematic diagram of a control circuit according to the present invention for driving the modulating device shown in FIG. 11.

Like the modulator 124 of FIGS. 8 and 9, the primary piezoelectric element 250 is energized by driving signals from a control circuit, and the secondary piezoelectric element 252 is mechanically driven by the primary element 250 and generates a feedback control signal in response to its driven motion. As illustrated in FIG. 13, the modulator 224 forms an integral, active part of the control circuit, which also includes a voltage controlled oscillator 270, a phase comparator 272, and a low pass filter 274. The voltage controlled oscillator 270 provides driving signals to the primary piezoelectric element 250 and also provides an error signal to the phase comparator 272. The secondary piezoelectric element 252 provides the signal indicative of the phase and frequency of the primary piezoelectric element 250 to the phase comparator 272. The phase comparator 272 provides an output that is a function of the signals received from the oscillator 270 and the secondary piezoelectric element 252 to the oscillator 270. The circuit is thus adapted to drive the modulator to its resonant point and to hold it at that point during operation of the temperature measuring instrument.

The vibration of the primary piezoelectric element 250 causes the vertical blocking member 258 to move in a sideways chopping motion to convert a steady radiation beam 220 from the object (not shown) whose temperature is being measured into a pulsed IR beam 226. The pulsed beam 226 is received by the detector 228, which converts the pulsed IR energy into electrical energy. The detector 228 is connected with appropriate temperature indicating means that convert the electrical output of the detector to a display representative of the temperature of the object.

Figure 14:
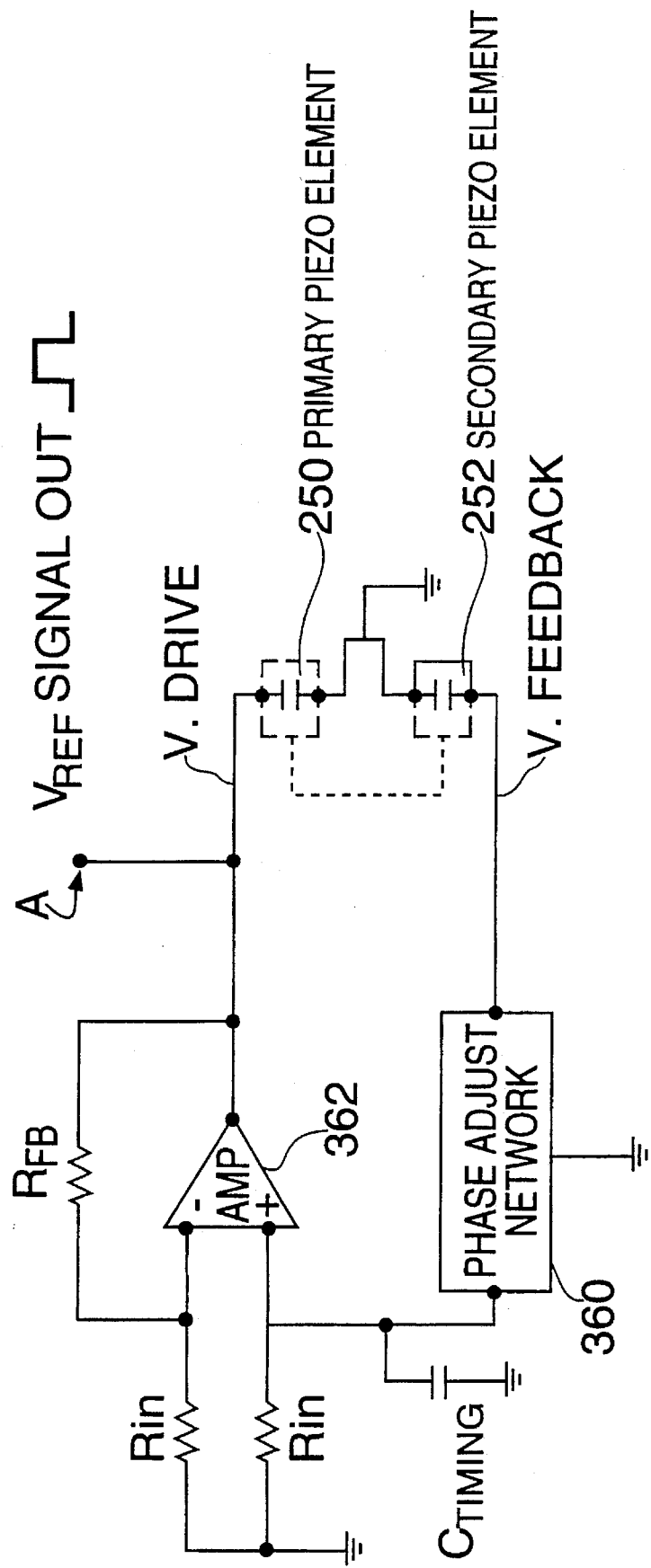
FIG. 14 is a schematic diagram of an alternative circuit according to the present invention for driving the modulating device shown in FIG. 11.

FIG. 14 illustrates a self-oscillating multi-vibrator circuit as an alternative to the phase locked loop drive circuit of FIG. 13. Like the FIG. 13 circuit, the FIG. 14 circuit can be used to drive the modulators shown in FIGS. 8 or 11. The FIG. 14 circuit requires fewer components and less power, making it attractive for less demanding portable applications.

In the FIG. 14 circuit, the piezoelectric elements 250, 252 are analogous to a quartz crystal controlling the frequency of an oscillator, where mechanical resonance replaces electrical resonance. In the circuit, the piezo elements 250, 252 are depicted as capacitors because of their similar construction and electrical charge storing properties.

In operation, powering up of the circuit causes shock excitation of the primary piezo element 250 and sets into motion the secondary piezo element 252. The output of the secondary element 252 through a phase compensation network 360 is a positive feedback voltage which initiates oscillation in the amplifier 362. As the sustained oscillation is changing frequency and amplitude, the circuit will seek the resonant point of the piezo element pair 250, 252 and lock at that value. The oscillation frequency will remain under tight control of the resonant characteristics of the piezo elements 250, 252 because the feedback signal is derived from and is part of the frequency determining element in the loop. A maximum deflection of the interrupter 258 occurs for a given circuit supply voltage. This circuit conveniently yields an electrical output signal at point A (FIG. 14) that can provide a reference signal for driving a "synchronous detection system."

While circuits formed by the modulators disclosed herein have been disclosed with particular reference to their use in conjunction with temperature measuring instruments, their phase locking characteristics make them attractive for use in other circuits where a stable modulating circuit is desired. The piezoelectric element is, however, particularly useful in the thermometer instrument of the type disclosed in view of its low power requirements, stability, simplicity and low cost. It makes a very practical battery-operated, hand-held temperature measuring instrument, providing quick, reliable performance. In practice, a person's temperature may be measured almost immediately since the response time of the instrument is on the order of a few milliseconds.

The present invention has been described in the foregoing specification with respect to specific embodiments that serve as examples to illustrate the invention rather than to limit its scope. Modifications may be made to the described embodiments without departing from the broader teachings of the invention.

What is claimed is:

1. A resonant circuit, comprising:

a modulator having a resonant frequency and comprising a primary piezoelectric element adapted to vibrate when subjected to driving signals at a frequency related to the resonant frequency of said modulator, and a secondary piezoelectric element mechanically connected to said primary piezoelectric element, said secondary piezoelectric element being electrically insulated from said primary piezoelectric element and providing reference signals indicative of the phase and frequency of said modulator; and a phase locked loop oscillator circuit coupled to said primary and secondary piezoelectric elements to operate said modulator at its resonant frequency, said circuit including a voltage controlled oscillator providing the driving signals to said primary piezoelectric element, a phase comparator receiving signals from said oscillator and reference signals from said secondary piezoelectric element, said phase comparator also providing an input to said oscillator that is a function of the signals from said oscillator and the reference signals from said secondary piezoelectric element.

2. A resonant circuit, comprising:

a modulator having a resonant frequency and comprising a primary piezoelectric element adapted to vibrate when subjected to driving signals at a frequency related to the resonant frequency of said modulator, and a secondary piezoelectric element mechanically connected to said primary piezoelectric element, said secondary piezoelectric element being electrically insulated from said primary piezoelectric element and providing feedback signals indicative of the phase and frequency of said modulator; and a circuit coupled to said primary and secondary piezoelectric elements to operate said modulator at its resonant frequency, said circuit including an amplifier providing the driving signals to said primary piezoelectric element, and a phase adjust network circuit receiving the feedback signals from said secondary piezoelectric element, said phase adjust network providing an input to said amplifier to initiate oscillation therein and to lock the circuit at the resonant frequency of the modulator.

* * * * *

UNITED STATES PATENT AND TRADEMARK OFFICE
CERTIFICATE OF CORRECTION

PATENT NO. : 5,608,356
DATED : March 4, 1997
INVENTOR(S) : RUPERT et al.

It is certified that error appears in the above-identified patent and that said Letters Patent is hereby corrected as shown below:

In column 4, line 53, change "sniff" to --stiff--.

Signed and Sealed this

Fourteenth Day of April, 1998

Attest:

Attesting Officer

BRUCE LEHMAN
Commissioner of Patents and Trademarks